United States Patent
Brezak et al.

(10) Patent No.: US 7,698,381 B2
(45) Date of Patent: Apr. 13, 2010

(54) METHODS AND SYSTEMS FOR CONTROLLING THE SCOPE OF DELEGATION OF AUTHENTICATION CREDENTIALS

(75) Inventors: John E. Brezak, Woodinville, WA (US); Richard B. Ward, Redmond, WA (US); Donald E. Schmidt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1356 days.

(21) Appl. No.: 09/886,146

(22) Filed: Jun. 20, 2001

(65) Prior Publication Data

US 2003/0018913 A1 Jan. 23, 2003

(51) Int. Cl.
*G06F 15/16* (2006.01)
(52) U.S. Cl. .................... 709/219; 709/203; 709/217; 709/218
(58) Field of Classification Search ............. 709/225, 709/201, 203, 217, 218, 219, 223, 230, 232; 713/201, 200; 707/9, 10, 203; 726/2, 3, 726/4, 5, 16, 17, 18, 26, 27, 28, 29
See application file for complete search history.

(56) References Cited

U.S. PATENT DOCUMENTS

| | | | |
|---|---|---|---|
| 5,586,260 A | | 12/1996 | Hu |
| 5,590,199 A | | 12/1996 | Krajewski, Jr. et al. |
| 5,684,950 A | * | 11/1997 | Dare et al. ............... 713/201 |
| 5,764,890 A | | 6/1998 | Glasser |
| 5,864,665 A | | 1/1999 | Tran |
| 5,875,296 A | | 2/1999 | Shi et al. |
| 6,198,824 B1 | * | 3/2001 | Shambroom ............... 380/279 |
| 6,199,113 B1 | * | 3/2001 | Alegre et al. ............... 709/229 |
| 6,298,383 B1 | * | 10/2001 | Gutman et al. ............... 709/229 |
| 6,401,211 B1 | * | 6/2002 | Brezak et al. ............... 713/201 |
| 6,405,312 B1 | | 6/2002 | Ly |
| 6,427,209 B1 | * | 7/2002 | Brezak et al. ............... 713/201 |

(Continued)

FOREIGN PATENT DOCUMENTS

EP 1168763 1/2002

(Continued)

OTHER PUBLICATIONS

Fox et al., Security on the Move: Indirect Authentication Using Kerberos, 1996.*

(Continued)

*Primary Examiner*—Chi H Pham
*Assistant Examiner*—Weibin Huang
(74) *Attorney, Agent, or Firm*—Merchant & Gould, P.C.

(57) ABSTRACT

Methods and systems are provided for controlling the scope of delegation of authentication credentials within a network environment. A server is configured to provide a trusted third-party with a ticket authenticating the server, information about a target service that a server seeks to access on behalf of the client, and a service ticket associated with the client. This service ticket may be provided by the client or may be a previously granted service ticket granted to the server for itself in the name of the client. The trusted third-party grants a new service ticket to access the target service to the server, in the client's name, if such delegation is permitted according to delegation constraints associated with the client.

15 Claims, 5 Drawing Sheets

U.S. PATENT DOCUMENTS

| | | | |
|---|---|---|---|
| 6,453,419 | B1 | 9/2002 | Flint |
| 6,643,774 | B1 * | 11/2003 | McGarvey ................. 713/155 |
| 6,653,419 | B1 | 11/2003 | Petrov et al. |
| 6,678,733 | B1 | 1/2004 | Brown |
| 6,742,114 | B1 | 5/2004 | Carter |
| 6,769,068 | B1 * | 7/2004 | Brozowski et al. ............. 726/5 |
| 7,113,994 | B1 * | 9/2006 | Swift et al. ................. 709/229 |
| 2003/0018913 | A1 | 1/2003 | Brezak |
| 2003/0188193 | A1 | 10/2003 | Venkataramappa |
| 2003/0212806 | A1 | 11/2003 | Mowers et al. |
| 2005/0074126 | A1 | 4/2005 | Stanko |

FOREIGN PATENT DOCUMENTS

| | | |
|---|---|---|
| EP | 1249983 | 10/2002 |
| EP | 1619856 A1 | 1/2006 |
| EP | 1619856 B1 | 7/2008 |

OTHER PUBLICATIONS

Freier et al., the SSL Protocol Version 3.0, Nov 18, 1996.*

Trostle et al.; "A Flexible Distributed Authorization Protocol" IEEE Comput Soc Network and Distributed Security Proceedings of the Symposium San Diego CA, Feb. 1996 pp. 43-52.

Ayadi et al.; "On the Formal Verification of Delegation in SESAME" IEEE Computer Assurance Proceedings of the 12th Annual Conference Gaithersburg MD, Jun. 1997 pp. 23-34.

McMahon P.V.; "Sesame V2 Public Key and Authorisation Extensions to Kerberos" IEEE Comput Society Network and Distributed System Security Proceedings of the Symposium San Diego CA Feb. 1995 pp. 114-131.

Deng et al. "Integrating security in CORBA based object architectures," Security and Privacy, 1995, Proceedings 1995 IEEE Symposium, Oakland CA, May 8-10, 1995, pp. 50-61.

Piessens et al., "Interconnecting domains with heterogeneous key distribution and authentication protocols," Research in Security and Privacy, 1993, Proceedings 1993 IEEE Computer Society Symposium, Oakland CA, May 24-26, 1993, pp. 66-79.

Deitel et al.; Java How to Program book, Prentice Hall, Third edition, 1999 (additional cited pp., 214-226, 817-838) Note: for other pages refer to previously provided from PTO-892, paper No. 6, dated Feb. 2, 2004.

Morrie Gasser, Ellen McDermott, "An architecture for Practical Delegation in a Distributed system" Published Date: 1990. http://csdl2.computer.org/persagen/DLAbsToc.jsp?resourcePath=dl/proceedings/&toc=comp/proceedings/sp/1990/2060/00/2060toc.xml&DOI=10.1109/RISP-1990.63835.

Marlena E. Erdod, Joseph N. Pato, "Extending the OSF DCE Authorization System to Support Practical Delegation," Publication Date: Feb. 11-12, 1993. http://citeseer.ist.psu.edu/cache/papers/cs/1241/http:zSzzSznii.isi.eduzSzpublicationszSzsndsszSz1993zSz93sndsserdos-pato.pdf/erdos93extending.pdf.

Theron Donald Tock, "An Extensible Framework for Authentication and Delegation" Publication Date: 1994. http://srg.cs.uiuc.edu/Security/Papers.

Chu, John and Fischer, Michael. "A Secure Socket Layer Proxy for a Kerberos Authenticated Intranet," 1998, [2 pages].

Richard, Stevens W. "Advanced Programming in the UNIX Environment," Addison Wesley 1992. Chapter 9, pp. 237-262; Chapter 14, pp. 427-474; Chapter 15, pp. 475-514.

Tuvell, Walter. "Response to Problems with DCE Security Services," ACM SIGCOMM Computer Communication Review, vol. 26, Issue 2 (Apr. 1996). Pp. 64-73.

Chatel, M. "Classical versus Transparent IP Proxies," RFC 1919, Mar. 1996, [35 pages].

A-Select, Overview of A-Select [online], © 2002-2005, [Retrieved Aug. 10, 2007], Retrieved from: http://www.aselect.org/aselect_overview.html.

A-Select, Operational Concept and System Description [online], [Retrieved Dec. 10, 2007], Retrieved from: http://www.a-select.org/doc/aselect1.4.1.ocd.html#Toc103358174.

Condell, M., A Security Model for the Information Mesh, May 9, 1996.

Duserick et al., Whitepaper on Liberty Protocol and Identity Theft [online], Feb. 20, 2004, [Retrieved Dec. 10, 2007], Retrieved from: http://www.projectliberty.org/liberty/content/view/full/340/(offset)/30.

Erdos, M., Pato, J., Extending the OSF DCE Authorization System to Support Practical Delegation [online], PSRG Workshop on Network and Distributed System Security, Feb. 11-12, 1993, [Retrieved Apr. 9, 2007], Retrieved from: http://www.opengroup.org/tech/rfc/mirror-rfc/rfc3.0.txt.

Faden, G., Authorization Infrastructure in Solaris [online], Aug. 2001, [Retrieved Dec. 10, 2007], Retrieved from: http://developers.sun.com/solaris/articles/ais.html.

Gasser, M., McDermott, E., An Architecture for Practical Delegation in a Distributed System, 1990.

Kemp, J., Canales, C., Glade, B., Madsen, P., Rouault, J., Liberty ID-WSF—a Web Services Framework [online], 2004, [Retrieved Dec. 10, 2007], Retrieved from: http://www.projectliberty.org/liberty/content/viewffulV340/(offset)/30.

Landau, S., Hodges, J., A Brief Introduction to Liberty [online], Feb. 13, 2003, [Retrieved Dec. 10, 2007], Retrieved from: http://research.sun.com/liberty_intro/ABItL/index.html.

Layer7 Technologies, Identity Federation and Delegated Authentication for Web Services [online], Sep. 11, 2005, [Retrieved Dec. 10, 2007], Retrieved from http://web.archive.org/web/20050911153538/http://www.layer7-tech.com/solutions/identity_federation.html.

Liberty Alliance Project, Introduction to the Liberty Alliance Identity Architecture [online], Mar. 2003, [Retrieved Dec. 10, 2007], Retrieved from: http://www.projectliberty.org/liberty/content/view/full/340/(offset)/30.

Novell, Novell iManager: Planning Security for Delegated Administration [online], © 2003, [Retrieved Dec. 10, 2007], Retrieved from: http://www.novell.com/collateral/4621360/4621360.html.

Stevens, W., Rago, S., Advanced Programming in the UNIX Environment, Second Edition, Addison-Wesley, 2005.

Sun, Secure Enterprise Computing with the Solaris 8 Operating Environment [online], 2000, [Retrieved Dec. 10, 2007], Retrieved from: http://www.sun.com/software/whitepapers/wp-s8security/wp-s8security.pdf.

Sun (Solaris Role Based Access Control) (RBAC) (No Document).

Sun (Trusted Solaris) (No Document).

Sun Microsystems Documentation [online], [Retrieved Dec. 10, 2007], Retrieved from: http://docs.sun.com/app/docs/816-1047/6m7g9esuc?a=view.

Tock, T., An Extensible Framework for Authentication and Delegation, 1994.

Tuvell, W., Response to 'Problems with Dce Security Services', ACM SIGCOMM Computer Communication Review, vol. 25, Issue 2, Apr. 1996.

Wikipedia, Role-based access control [online], [Retrieved Dec. 11, 2007], Retrieved from: http://en.wikipedia.org/wiki/RBAC.

European Search report for application No. EP 02010767.8 dated Aug. 17, 2004.

European Search report for application No. EP 05020603.6 dated Dec. 7, 2005.

Armando Fox, et al., "Security on the Move: Indirect Authentication Using Kerberos", Proceedings of the 2ndAnnual International Conference on Mobile Computing and Networking (MOBICOM '96), pp. 155-164, ACM, 1996, Rye, NY, USA.

Examination Report for European Patent Application No. EP 02 010 767.8 dated Jan. 29, 2007.

Examination Report for European Patent Application No: EP 05 020 603.6 dated Aug. 10, 2007.

First Notice of Rejection for Japanese Patent Application No. 2002-180423 dated May 27,2008.

Second Notice of Rejection for Japanese Patent Application No. 2002-180423 dated Dec. 2, 2008.

* cited by examiner

METHODS AND SYSTEMS FOR CONTROLLING THE SCOPE OF DELEGATION OF AUTHENTICATION CREDENTIALS

TECHNICAL FIELD

This invention relates generally to computer access control, and more particularly to methods and systems for controlling the scope of delegation of authentication credentials.

BACKGROUND

Access control is paramount to computer security. To protect the integrity of computer systems and the confidentiality of important data, various access control schemes have been implemented to prevent unauthorized users and malicious attackers from gaining access to computer resources.

To ensure the comprehensiveness of computer security, access control is often implemented on various levels. For instance, on the level of one computer, a user is typically required to go through a logon procedure in which the computer determines whether the user is authorized to use the computer. In addition, on the level of a computer network, a user is commonly required to go through a user-authentication process for purposes of controlling the user's access to various network services. Even after a network access control server has authenticated the user, the user may still have to request a permit for a specific server in order to access that service. Various schemes based on different protocols, such as the Kerberos 5 protocol, have been proposed and implemented for controlling network access control by means of user authentication.

Generally, the user logon for a computer and the user authentication for network access control are two separate procedures. Nevertheless, to minimize the burden on a user in dealing with the different access control schemes, the user logon and the user authentication for network access are sometimes performed together. For example, in the case where the user authentication is implemented under the Kerberos protocol, when the user logs on the computer, the computer may also initiate a Kerberos authentication process. In the authentication process, the computer contacts a Kerberos Key Distribution Center (KDC) to first obtain a ticket-granting ticket (TGT) for the user. The computer can then use the TGT to obtain from the KDC, a session ticket for itself.

As networks have evolved, there has been a trend to have multiple tiers of server/service computers arranged to handle client computer requests. A simple example is a client computer making a request to a World Wide Web website via the Internet. Here, there may be a front-end web server that handles the formatting and associated business rules of the request, and a back-end server that manages a database for the website. For additional security, the web site may be configured such that an authentication protocol forwards (or delegates) credentials, such as, e.g., the user's TGT, and/or possibly other information from the front-end server to a back-end server. This practice is becoming increasingly common in many websites, and/or other multiple-tiered networks.

Thus, any server/computer in possession of the user's TGT and associated authenticator can request tickets on behalf of the user/client from the KDC. This capability is currently used to provide forwarded ticket delegation. Unfortunately, such delegation to a server is essentially unconstrained for the life of the TGT. Consequently, there is a need for improved methods and systems that support delegation of authentication credentials in complex network configurations, but in a more constrained manner.

SUMMARY

Improved methods and systems are provided herein, which provide constrained delegation of authentication credentials.

The above stated needs and others are met, for example, by a method that includes identifying a target service to which access is sought on behalf of a client, and causing a server to request a new service credential, for use by the server, from a trusted third-party. To accomplish this, the server provides the trusted third-party with a credential authenticating the server, information about the target service, and a service credential previously obtained by the client, or by the server on behalf of the client. Here, the new service credential is granted in the identity of the client rather than that of the server, but can only be used by the server to gain access to the target service.

BRIEF DESCRIPTION OF THE DRAWINGS

A more complete understanding of the various methods and systems of the present invention may be had by reference to the following detailed description when taken in conjunction with the accompanying drawings wherein.

DETAILED DESCRIPTION

Figure 1:
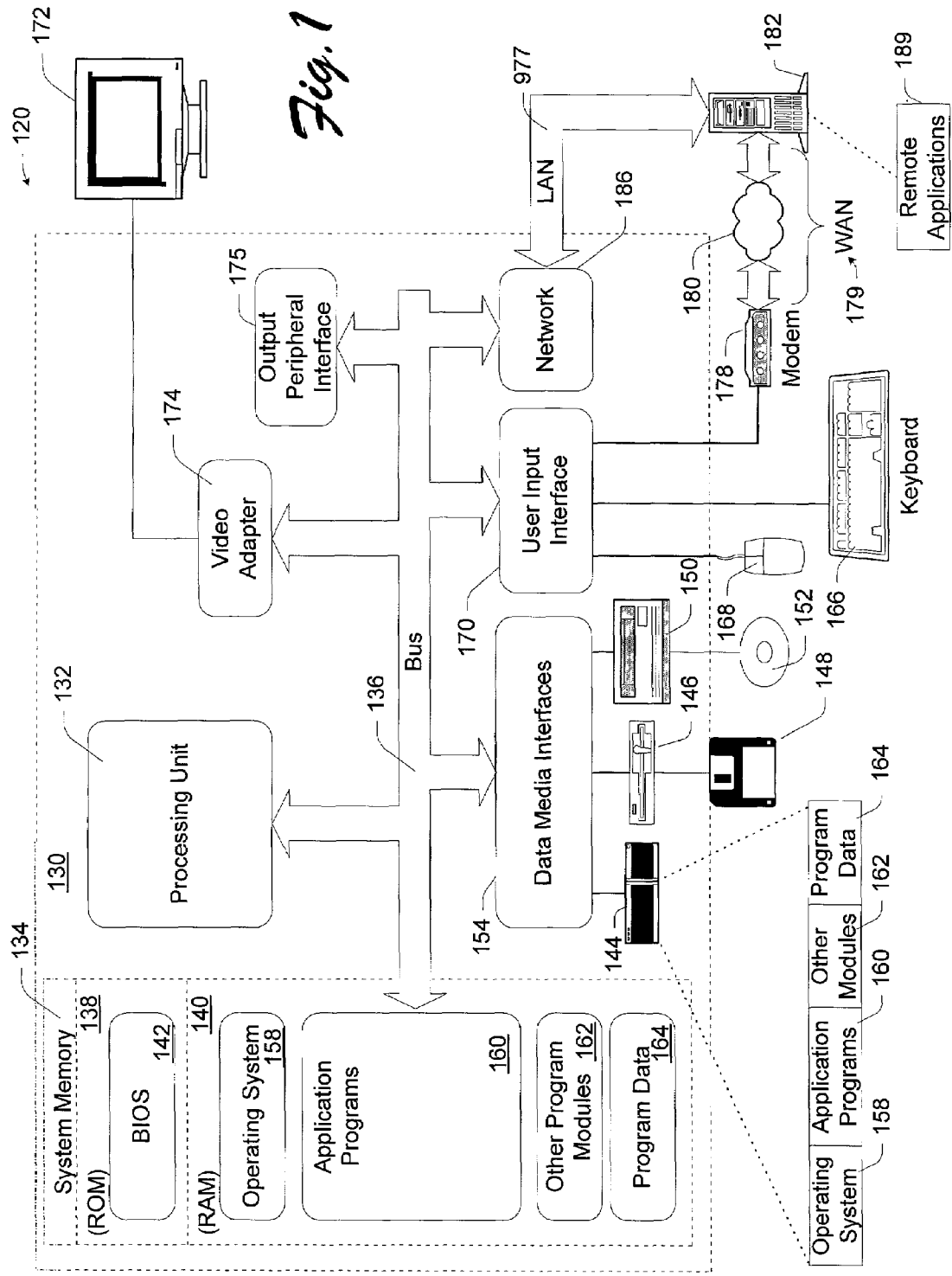
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and systems may be implemented.

Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or nonvolatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

This description will now focus on certain aspects of the present invention for controlling the scope of delegation of authentication credentials in a client-server network environment. While the following description focuses on exemplary Kerberos-based systems and improvements there to, the various methods and systems of the present invention are also clearly applicable to other authentication systems and techniques. For example, certificate-based authentication systems and techniques may adapt certain aspects of the present invention.

As mentioned above, having possession of a client's ticket granting ticket (TGT) and associated authenticator allows the holder to request tickets on behalf of the client from the trusted third-party, e.g., a key distribution center (KDC). Such unconstrained delegation is currently supported in certain implementations of Kerberos that have forwarded ticket delegation schemes.

With this in mind, methods and systems are provided to constrain or otherwise better control the delegation process. The methods and systems can be used with different authentication protocols. The delegation process is controlled in certain exemplary implementations through a service-for-user-to-proxy (S4U2proxy) technique. The S4U2proxy technique is preferably implemented as a protocol that allows a server or service, such as, e.g., a front-end server/service, to request service tickets on behalf of a client for use with other servers/services. As described in greater detail below, the S4U2proxy protocol advantageously provides for constrained delegation in a controllable manner that does not require the client to forward a TGT to the front-end server.

Another technique provided herein is a service-for-user-to-self (S4U2self) technique. The S4U2self technique or protocol allows a server to request a service ticket to itself, but with the client's identity being provided in the resulting service ticket. This allows, for example, a client, which has been authenticated by other authentication protocols, to essentially have a service ticket that can then be used with the S4U2proxy protocol to provide constrained delegation. There are two exemplary forms to the S4U2self technique, namely a "no evidence" form and an "evidence" form. In the no evidence form, the server is trusted to authenticate the client, for example, using another security/authentication mechanism that is private to the server, for example. In the evidence form, the KDC (or a trusted-third-party) makes the authentication based on information (evidence) provided about the client obtained when the client authenticated to the server.

With the methods and systems provided herein, a client may access servers/services within a Kerberos environment regardless as to whether the client has been authenticated by Kerberos or some other authentication protocol. Consequently, back-end and/or other servers/services can be operated in an essentially Kerberos only environment.

Figure 2:
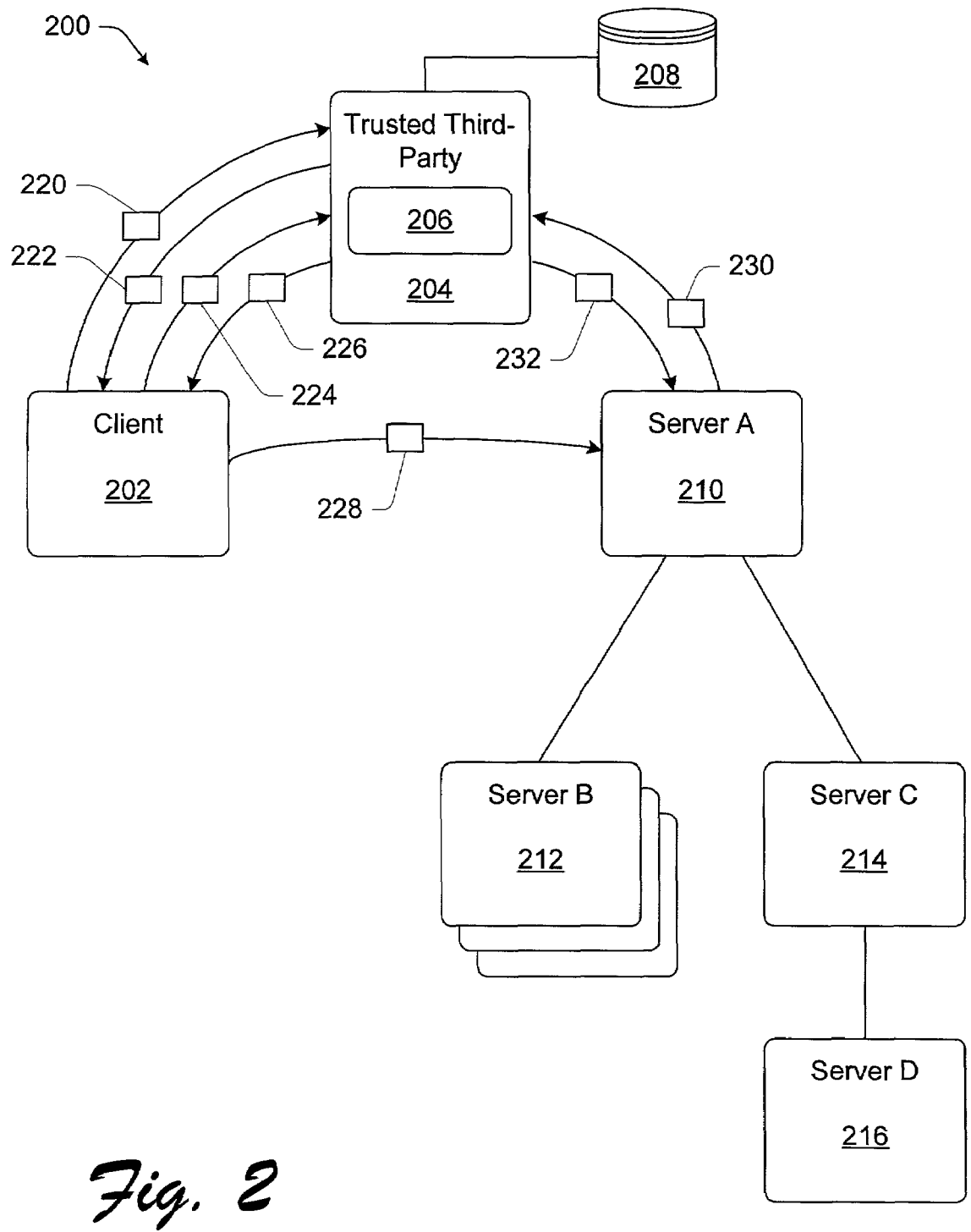
FIG. 2 is a block diagram depicting a service-for-user-to-proxy (S4U2proxy) process performed within a client-server environment, in accordance with certain exemplary implementations of the present invention.

Reference is now made to the block diagram in FIG. 2, which depicts an S4U2proxy protocol/process within a client-server environment 200, in accordance with certain exemplary implementations of the present invention.

As shown, a client 202 is operatively coupled to a trusted third-party 204 having operatively configured therein an authentication service 206, e.g., a KDC, a certificate granting authority, a domain controller, and the like. Authentication service 206 is configured to access information maintained in a database 208. Client 202 and trusted third-party 204 are further operatively coupled to a server, namely server A 210. Note, as used herein, the terms server and service are used intermixable to represent the same or similar functionality.

In this example, server A 210 is a front-end server to a plurality of other servers. Thus, as depicted, server A 210 is operatively coupled to server B 212 and server C 214. As illustrated, server B 212 may be a replicated service. Also, server C 214 is further operatively coupled to a server D 216.

In response to a user logging on at client 202, an authentication request (AS_REQ) message 220 is sent to authentication service 206, which responds with an authentication reply (AS_REP) message 222. Within AS_REP message 222, is a TGT associated with the user/client. The same or similar procedure (not illustrated) is followed to authenticate server A 210.

When client 202 wants to access server A 210, the client sends a ticket granting service request (TGS_REQ) message 224 to authentication service 206, which returns a ticket granting service reply (TGS_REP) message 226. TGS_REP message 226 includes a service ticket associated with client 202 and server A 210. Subsequently, to initiate a communication session, client 202 forwards the service ticket to server A 210, in an application protocol request (AP_REQ) message 228. Such processes/procedures are well known, and as such are not disclosed herein in greater detail.

In the past, to support delegation, the client would need to provide server A 210 with the client's TGT to allow server A 210 to request additional service tickets on behalf of client 202. This is no longer necessary. Instead, when server A 210 needs to access another server on behalf of client 202, for example, server C 214, then server A 210 and authentication service 206 operate according to the S4U2proxy protocol.

Thus, by way of example, in accordance with certain exemplary S4U2proxy protocol implementations, server A 210 sends a TGS_REQ message 230 to authentication service 206. TGS_REQ message 230 includes the TGT for server A 210 and the service ticket received from client 202, and identifies the desired or targeted server/service to which client 202 is seeking access, e.g., server C 214. In Kerberos, for example, there is a defined extensible data field, which is typically referred to as the "additional tickets" field. This additional tickets field can be used in the S4U2proxy protocol to carry the service ticket received from client 202, and a KDC options field can include a flag or other indicator that instructs the receiving KDC to look in the additional tickets field for a ticket to be used to supply a client identity. Those skilled in the art will recognize that these or other fields and/or data structures can be used to carry the necessary information to authentication service 206.

In processing TGS_REQ 230, authentication service 206 determines if client 202 has authorized delegation, for example, based on the value of a "forwardable flag" established by client 202. Thus, delegation per client is enforced by the presence of the forwardable flag in the client's service ticket. If client 202 does not want to participate in delegation, then the ticket is not flagged as forwardable. Authentication service 206 will honor this flag as a client initiated restriction.

In other implementations, authentication service 206 may access additional information in database 208 that defines selected services that server A 210 is allowed to delegate to (or not delegate to) with respect to client 202.

If authentication service 206 determines that server A 210 is allowed to delegate to the targeted server/service, then a TGS_REP message 232 is sent to server A 210. TGS_REP message 232 includes a service ticket for the targeted server/service. This service ticket appears as if client 202 requested it directly from authentication service 206, for example, using the client's TGT. However, this was not done. Instead, authentication service 206 accessed the similar/necessary client information in database 208 after being satisfied that the authenticated client is essentially involved in the request based on the service ticket that authenticated server A 210 received from client 202 and included in TGS_REQ message 230. However, since the client information is carried in the client's ticket, the server only needs to copy the data from the ticket. Thus, database 208 can be used, but copying the data in the ticket tends to be more efficient.

In certain implementations, for example, TGS_REP message 232 identifies the targeted server/service and client 202, and further includes implementation-specific identity/user/client account data, e.g., in the form of a privilege attribute certificate (PAC), a security identifier, a Unix ID, Passport ID, a certificate, etc.. A PAC, for example, may be generated by authentication service 206, or simply copied from the client's service ticket that was included in TGS_REQ message 230.

Figure 4:
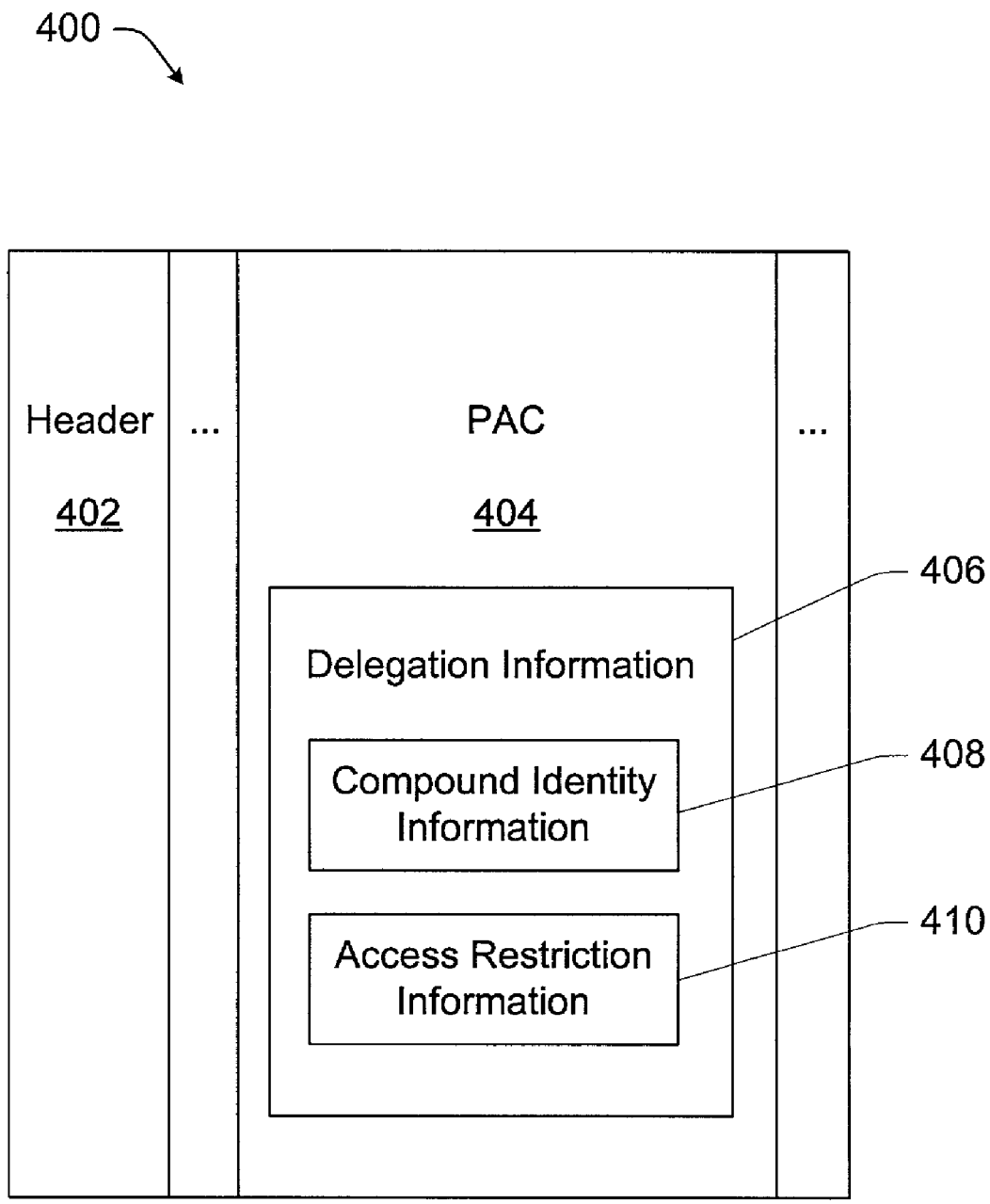
FIG. 4 is an illustrative diagram depicting selected portions of a message format suitable for use with certain implementations of the present invention.

PAC or other user/client account data may also be configured to include information relating to the scope of delegation. Thus, for example, attention is drawn to FIG. 4, which is an illustrative diagram depicting selected portions of a Kerberos message 400 having a header 402 and a PAC 404. Here, PAC 404 includes delegation information 406. As illustrated, delegation information 406 includes compound identity information 408 and access restriction information 410.

Compound identity information 408 may, for example, include recorded information about the delegation process, such as, e.g., an indication regarding the fact that server A 210 requested the service ticket on behalf of user/client 202. Here, a plurality of such recorded information may be provided that can be used to string together or otherwise identify the history over multiple delegation processes. Such information may be useful for auditing purposes and/or access control purposes.

Access restriction information 410 may be used, for example, in conjunction with an access control mechanism to selectively allow access to certain servers/services provided that client 202 has either directly or indirectly through server A 210 sought to access the serer/service, but not if the server/service is being indirectly sought through server B 212. This feature adds additional control over the delegation of authentication credentials.

Figure 3A:
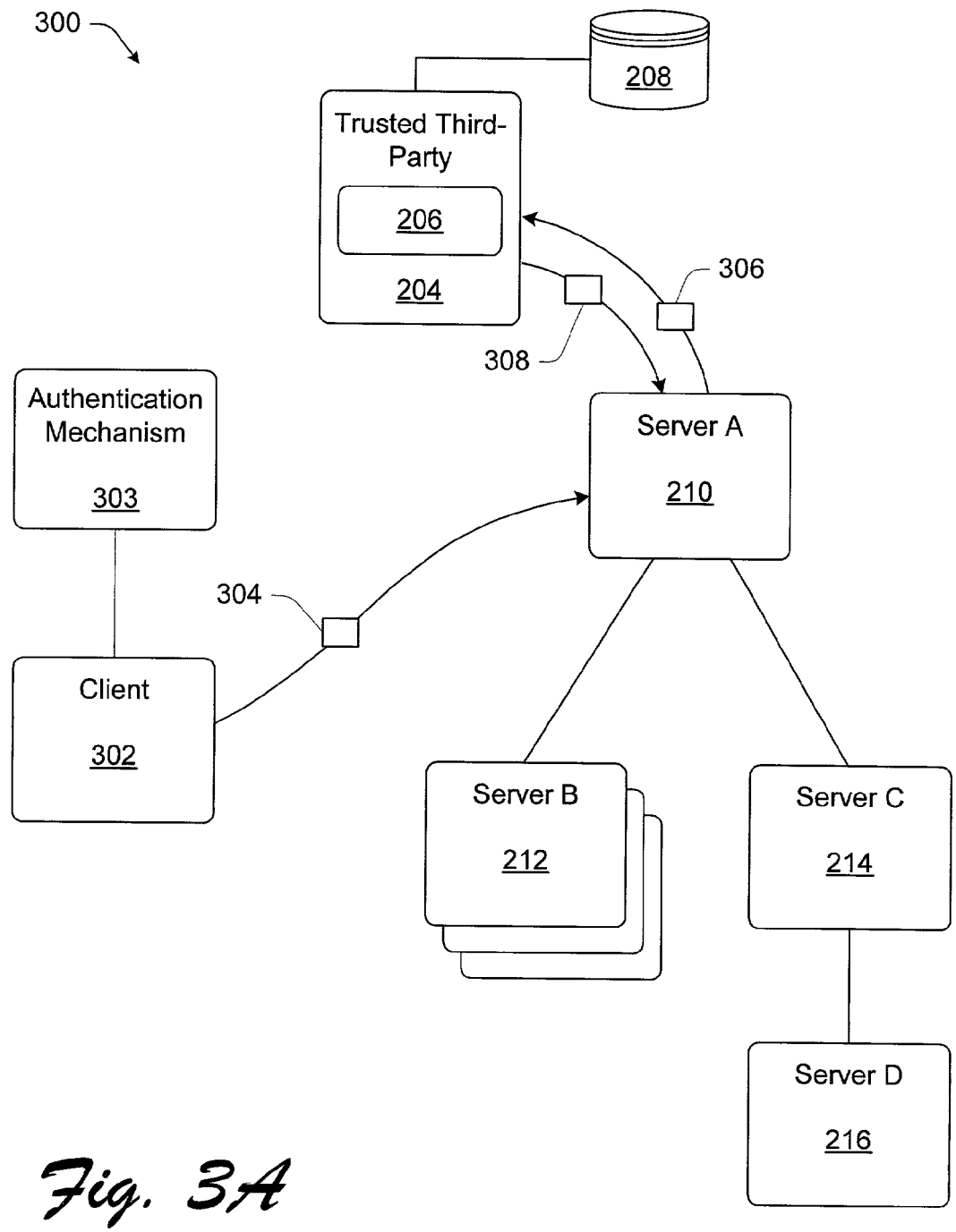
FIG. 3A is a block diagram depicting a service-for-user-to-self (S4U2self) process performed within a client-server environment, in accordance with certain exemplary implementations of the present invention.

In the above examples client 202 was authenticated by authentication service 206. However, it is recognized that other clients may not be so authenticated. An example of such a situation is depicted in FIG. 3A. Here, a client 302 has been authenticated using a different authentication protocol mechanism 303. For example, authentication protocol mechanism 303 may include Passport, secure sockets layer (SSL), NTLM, Digest, or other like authenticating protocols/procedures. Here, in this example, it is assumed that client 302 chooses to access a targeted service, which just so happens to be provided by server C 214 . This choice can be satisfied using the above-described S4U2proxy protocol, but only after server A 210 has completed/followed an S4U2self protocol/procedure.

One basic premise with the S4U2self protocol is that the server, e.g., server A 210, is able to request a service ticket to itself for any user/client that is accessing the server and which the server has itself authenticated. The exemplary S4U2self protocol described herein is configured to support clients that have authenticating "evidence" and clients that do not have such authenticating evidence.

Figure 3B:
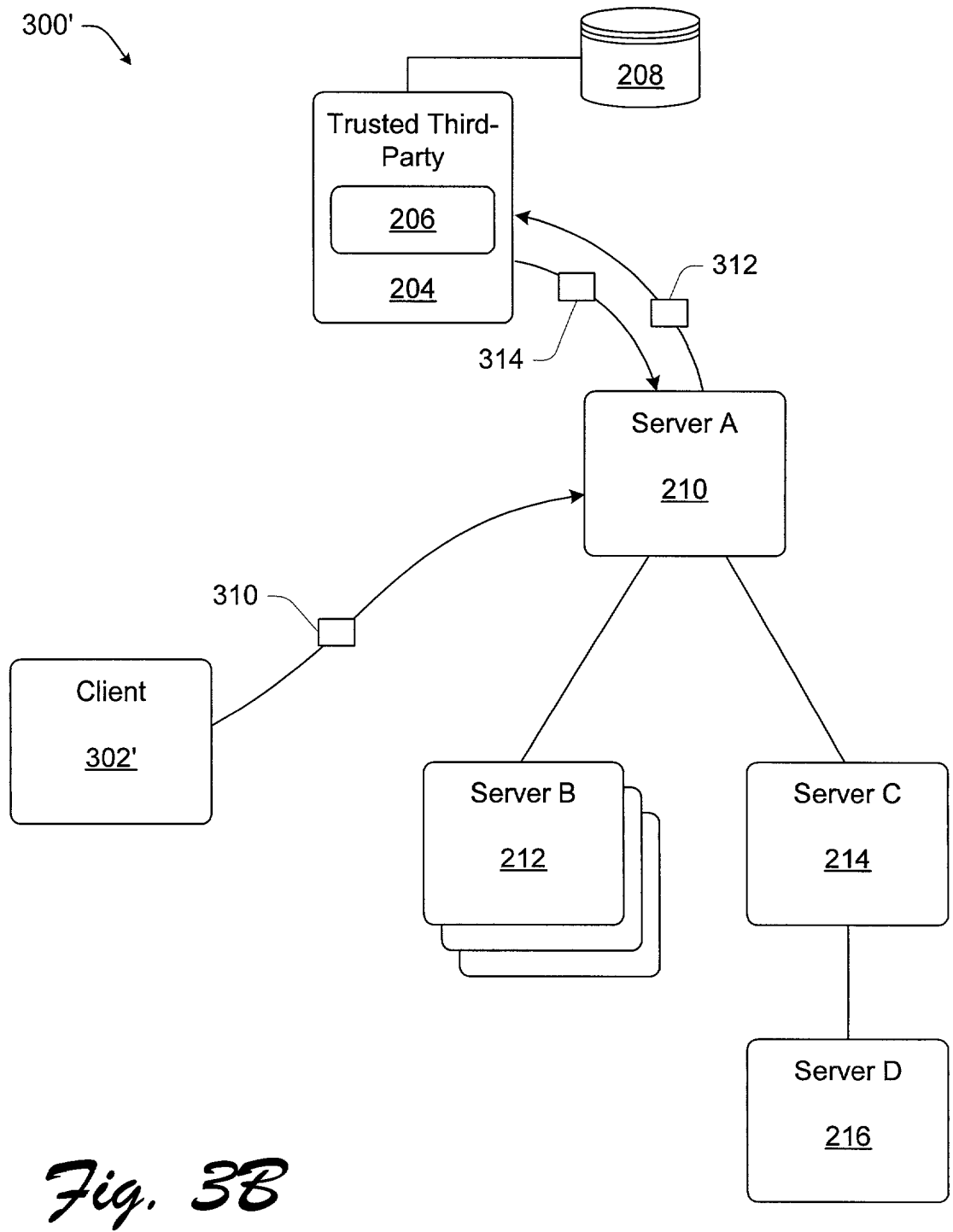
FIG. 3B is a block diagram depicting a service-for-user-to-self (S4U2self) process performed within a client-server environment, in accordance with certain further exemplary implementations of the present invention.

In the absence of authentication evidence that can be evaluated by authentication service 206, server A 210 will need to come to "trust" client 302. Thus, for example, if client 302 has an authentication certificate or like mechanism 304 that server A 210 is able to validate, then the client 302 may be determined to be "trusted". Here, client 302 is essentially being authenticated by server A 210. Next, server A 210 sends a TGS_REQ message 306 to authentication service 206 requesting a service ticket to itself for client 302. In response, authentication service 206 generates a TGS_REP message 308 that includes the requested service ticket. The received service ticket is then used in a subsequent S4U2proxy protocol/procedure to request a service ticket to server C 214 for client 302. In certain Kerberos implementations, for example, this requires that a forwardable flag in the TGS_REP message 308 be set to allow forwarding of the service ticket. The trusted third-party may also build a PAC for client 302, which can then be included in the resulting service ticket If evidence of the authentication does exist for a client 302', then server A 210 can include such evidence in a TGS_REQ message 312 as additional pre-authentication data. This is illustratively depicted in environment 300' in FIG. 3B. Here, evidence information 310 is provided by client 302' to server A 210. Evidence information 310 may include, for example, a challenge/response dialog, or other, information generated by another "trusted" entity. Upon receipt of evidence information 310 and subsequent validation, authentication service 206 will grant the requested service ticket to server A 210 itself. It is noted, that in certain implementations, with the use of evidence it may be possible for the server to obtain a restricted TGT for the client.

In certain Kerberos implementations, the forwardable flag in the TGS_REP message 314 will be set to allow forwarding of the service ticket. If a PAC was provided in TGS_REQ message 312, then it can be used in the service ticket, otherwise, a PAC may be generated by authentication service 206 (here, a KDC) based on evidence information 310. For example, in S4U2self, the identity of the client is included in the pre-authentication data. This identity can be used in the construction of the PAC for that client and added to the issued service ticket to the server (for the client).

Although some preferred implementations of the various methods and systems of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method for constraining delegation of service requests made by a first server on behalf of a client, the method comprising:
   receiving, at the first server, an authentication mechanism for the client, wherein the authentication mechanism is generated using a first authentication method;
   authenticating, by the first server, the client based upon the authentication mechanism, wherein such authentication is performed according to the first authentication method;
   identifying, by the first server, a target service to which access is sought on behalf of the client, wherein the target service is resident on a target server;
   sending, by the first server, a request according to a second authentication method to a trusted third-party to issue a first service ticket to the first server for the client, wherein the first service ticket is used with the second authentication method, and wherein the second authentication method is different from the first authentication method;
   receiving, at the first server, the first service ticket to the first server, wherein the first service ticket to the first server specifies that the first service ticket is delegable through the presence of a forwardable flag in the first service ticket;

requesting, by the first server, a target service ticket from the trusted third-party to access the target service on behalf of the client, wherein the first server provides the trusted third-party with the first service ticket when requesting the target service ticket, and wherein the target service ticket is used with the second authentication method; and sending the target service ticket to the target server.

2. The method as recited in claim 1, wherein the target service ticket is configured for use by the server and the target service to which access is sought.

3. The method as recited in claim 1, wherein the first server is a front-end server, and wherein the target server is a back-end server that is coupled to the first server.

4. The method as recited in claim 1, wherein the first authentication method is selected from a group of authentication methods comprising Passport, SSL, NTLM, and Digest.

5. The method as recited in claim 1, wherein the second authentication method includes a Kerberos authentication protocol.

6. A computer-readable storage medium on a first server storing computer-executable instructions for performing a method of constraining delegation of service requests made by the first server on behalf of a client, the method comprising:

receiving, at the first server, an authentication mechanism for the client, wherein the authentication mechanism is generated using a first authentication method;

authenticating, by the first server, the client based upon the authentication mechanism, wherein such authentication is performed according to the first authentication method;

identifying, by the first server, a target service to which access is sought by the client, wherein the target service is resident on a target server;

sending, by the first server, a request according to a second authentication method to a trusted third-party to issue a first service ticket to the first server for the client, wherein the first service ticket is used with the second authentication method, and wherein the second authentication method is different from the first authentication method;

receiving, at the first server, the first service ticket to the first server, wherein the first service ticket to the first server specifies that the first service ticket is delegable through the presence of a forwardable flag in the first service ticket;

requesting, by the first server, a target service ticket from the trusted third-party to access the target service on behalf of the client, wherein the first server provides the trusted third-party with the first service ticket when requesting the target service ticket, and wherein the target service ticket is used with the second authentication method; and sending the target service ticket to the target server.

7. The computer-readable medium as recited in claim 6, wherein the trusted third-party includes a key distribution center (KDC).

8. The computer-readable medium as recited in claim 6, wherein the target service ticket is configured for use by the server and the target service.

9. The computer-readable medium as recited in claim 6, further comprising authenticating the server to the trusted third-party, wherein a credential authenticating the server to the trusted third-party includes a ticket granting ticket associated with the server.

10. The computer-readable medium as recited in claim 6, wherein the first server is a front-end server, and wherein the target server is a back-end server that is coupled to the front-end server.

11. The computer-readable medium as recited in claim 6, wherein the first authentication method is selected from a group of authentication methods comprising Passport, SSL, NTLM, and Digest.

12. The computer-readable medium as recited in claim 6, wherein the second authentication method includes a Kerberos authentication protocol.

13. A method, performed by a trusted third-party, of constraining delegation of service requests made by a first server on behalf of a client, the method comprising:

receiving, at the trusted-third party, a first request from the first server for a first service ticket, wherein the first server provides evidence that the client has been authenticated to the first server using a first authentication method, and wherein the first service ticket is a service ticket granting the client access to services on the first server;

sending the first service ticket to the first server, wherein the first service ticket is used with a second authentication method, and wherein the second authentication method is different from the first authentication method;

receiving a second request from the first server to access a target server, wherein the first server is requesting to access the target server on behalf of the client, and wherein the second request comprises the first service ticket;

determining if the client has authorized delegation to the first server to request the access to the target service on the behalf of the client by checking the first service ticket for the presence of a forwardable flag; and if the forwardable flag is present in the first service ticket, generating a target service ticket and sending the target service ticket to the first server;

if the forwardable flag is not present, denying the second request.

14. The method of claim 13, wherein the first authentication method is selected from a group of authentication methods comprising Passport, SSL, NTLM, and Digest.

15. The method of claim 13, wherein the second authentication method includes a Kerberos authentication protocol.

* * * * *